(12) United States Patent
Siddharth (10) Patent No.: US 12,292,892 B2
(45) Date of Patent: May 6, 2025

(54) SYSTEM AND METHOD FOR GENERATING SEARCHABLE SOCIAL GRAPH

(71) Applicant: JPMorgan Chase Bank, N.A., New York, NY (US)

(72) Inventor: Patnaik Siddharth, Lyndhurst, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/383,175

(22) Filed: Oct. 24, 2023

(65) Prior Publication Data

US 2024/0134866 A1 Apr. 25, 2024
US 2024/0232208 A9 Jul. 11, 2024

Related U.S. Application Data

(60) Provisional application No. 63/418,785, filed on Oct. 24, 2022.

(51) Int. Cl.
*G06F 16/2457* (2019.01)
*G06F 16/22* (2019.01)

(52) U.S. Cl.
CPC .... *G06F 16/24575* (2019.01); *G06F 16/2264* (2019.01)

(58) Field of Classification Search
CPC .......... G06F 16/24575; G06F 16/2264; G06F 16/9024; G06Q 20/00; G06Q 50/01
USPC ................ 707/722, 743, 756, 769, 797, 798
See application file for complete search history.

(56) References Cited

U.S. PATENT DOCUMENTS

| | | | | |
|---|---|---|---|---|
| 7,433,832 | B1 * | 10/2008 | Bezos | G06Q 10/10 705/26.8 |
| 10,528,958 | B2 * | 1/2020 | Yang | G06F 16/9024 |
| 2018/0150617 | A1 * | 5/2018 | Richardson | H01J 49/164 |
| 2018/0203944 | A1 * | 7/2018 | Hawkes | G06F 16/3349 |
| 2019/0287113 | A1 * | 9/2019 | Wright | G06K 7/1417 |
| 2020/0167786 | A1 * | 5/2020 | Kursun | H04L 63/08 |
| 2020/0226156 | A1 * | 7/2020 | Borra | G06F 16/212 |

* cited by examiner

*Primary Examiner* — Phong H Nguyen
(74) *Attorney, Agent, or Firm* — GREENBLUM AND BERNSTEIN, P.L.C.

(57) ABSTRACT

A method for generating a social graph based on payment data is provided. The method includes extracting, from one or more databases, customer-based information for various entities and previous transaction information conducted by the various entities; generating data nodes for the various entities; determining a score for each of the data nodes with respect to a user based on the extracted customer-based information and the previous transaction information, in which the score indicating a proximity level with the user; generating a relationship model for the various data nodes with respect to the user based on the determined score; and identifying, based on a search performed for an input provided by the user on a user interface, one or more data nodes as potential candidates for conducting a transaction; and providing the potential candidates based on the proximity level with respect to the user.

20 Claims, 5 Drawing Sheets

SYSTEM AND METHOD FOR GENERATING SEARCHABLE SOCIAL GRAPH

CROSS-REFERENCE TO RELATED APPLICATION

This application claims the benefit of U.S. Provisional Patent Application No. 63/418,785, filed Oct. 24, 2022, which is hereby incorporated by reference in its entirety.

TECHNICAL FIELD

This disclosure generally relates to a system and method for generating a searchable social graph directory based on historical data. Further, the disclosure generally relates to providing a searchable platform for quickly identifying a target recipient via a search of a name.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Performing electronic payments allowed for much convenience conducting payment between private parties as well as between a consumer and a business. However, when sending an electronic payment via a payment service provider, such as Zelle, a recipient is not searchable, and requires a manual input of a payment recipient information, such as a phone number. However, due to providing of manual input of recipient information, submission of payment may be prone to error and it is difficult to ascertain whether a payment is sent to the designated recipient leading to unnecessary anxiety and requiring subsequent communication for verification of payment.

SUMMARY

According to an aspect of the present disclosure, a method for generating a social graph based on payment data is provided. The method includes performing, using a processor and a memory: extracting, from a carbon customer profile database, customer-based information for a plurality of entities; extracting, from a payment database, previous transaction information conducted by the plurality of entities; generating a plurality of data nodes for the plurality of entities; determining a score for each of the plurality of data nodes with respect to a user based on the extracted customer-based information and the previous transaction information, wherein the score indicating a proximity level with the user; generating a relationship model for the plurality of data nodes with respect to the user based on the determined score; identifying, based on a search performed for an input provided by the user on a user interface, one or more data nodes as potential candidates for conducting a transaction; and providing the potential candidates based on the proximity level with respect to the user.

According to another aspect of the present disclosure, the potential candidates are sequentially listed in accordance with the proximity level.

According to another aspect of the present disclosure, the proximity level includes a first level, a second level, and a third level.

According to yet another aspect of the present disclosure, the first level includes a data node having a direct relationship with the user.

According to another aspect of the present disclosure, the second level includes a data node having a direct relationship with the data node of the first level.

According to a further aspect of the present disclosure, the third level includes a data node having a direct relationship with the data node of the second level.

According to yet another aspect of the present disclosure, the customer-based information includes at least one of a mailing address, employment information, contact information, and a profile image.

According to a further aspect of the present disclosure, the previous transaction information includes a date of transaction, recipient information, sender information, an amount sent or received, and a location of transaction.

According to another aspect of the present disclosure, the plurality of entities includes at least an individual person and an organization.

According to a further aspect of the present disclosure, the providing of the potential recipient candidates includes providing of a corresponding address, contact information and a profile image.

According to another aspect of the present disclosure, the providing of the potential recipient candidates includes providing of application specific identifiers of potential recipient candidates.

According to further aspect of the present disclosure, the providing of the potential recipient candidates hides private information of at least one of the potential recipient candidates.

According to another aspect of the present disclosure, the providing of the potential recipient candidates excludes providing of private information of at least one of the potential recipient candidates.

According to further aspect of the present disclosure, the providing of the potential recipient candidates includes providing different sets of information for individual candidates and organizational candidates.

According to additional aspect of the present disclosure, the corresponding address and the contact information are only provided for organizational candidates.

According to a further aspect of the present disclosure, the providing of the potential recipient candidates further includes at least one corresponding historical transaction.

According to a further aspect of the present disclosure, the determining the score for each of the plurality of entities includes accessing a database to retrieve a corresponding score stored in a database.

According to a further aspect of the present disclosure, the determining the score for each of the plurality of entities includes dynamically generating a corresponding score based on a current location information of the user.

According to another aspect of the present disclosure, a system for generating a social graph based on payment data is disclosed. The system includes a user device of a user; and a server including at least a memory and a processor. The processor is configured to perform: extract, from a carbon customer profile database, customer-based information for a plurality of entities; extract, from a payment database, previous transaction information conducted by the plurality of entities; generate a plurality of data nodes for the plurality of entities; determine a score for each of the plurality of data nodes with respect to a user based on the extracted customer-based information and the previous transaction information, wherein the score indicating a proximity level with the user;

generate a relationship model for the plurality of data nodes with respect to the user based on the determined score; identify, based on a search performed for an input provided by the user on a user interface, one or more data nodes as potential candidates for conducting a transaction; and provide the potential candidates based on the proximity level with respect to the user.

According to another aspect of the present disclosure, a non-transitory computer readable storage medium that stores a computer program for generating a social graph based on payment data is disclosed. The computer program, when executed by a processor, extracting, from a carbon customer profile database, customer-based information for a plurality of entities; extracting, from a payment database, previous transaction information conducted by the plurality of entities; generating a plurality of data nodes for the plurality of entities; determining a score for each of the plurality of data nodes with respect to a user based on the extracted customer-based information and the previous transaction information, wherein the score indicating a proximity level with the user; generating a relationship model for the plurality of data nodes with respect to the user based on the determined score; identifying, based on a search performed for an input provided by the user on a user interface, one or more data nodes as potential candidates for conducting a transaction; and providing the potential candidates based on the proximity level with respect to the user.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
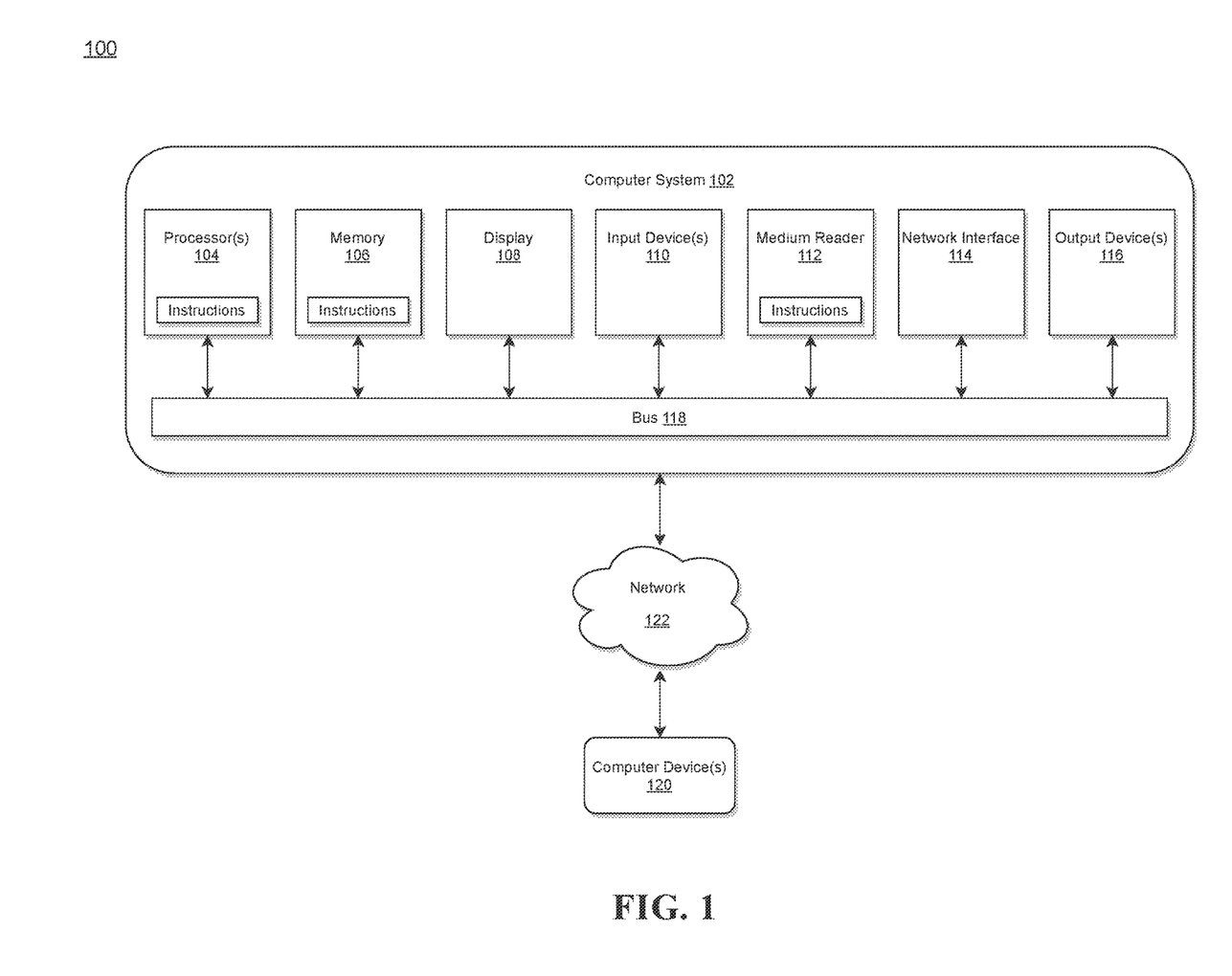
FIG. 1 illustrates a computer system for implementing a social graph generating system (SGGS) in accordance with an exemplary embodiment.

FIG. 1 illustrates a computer system for implementing a social graph generating system (SGGS) in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited thereto, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
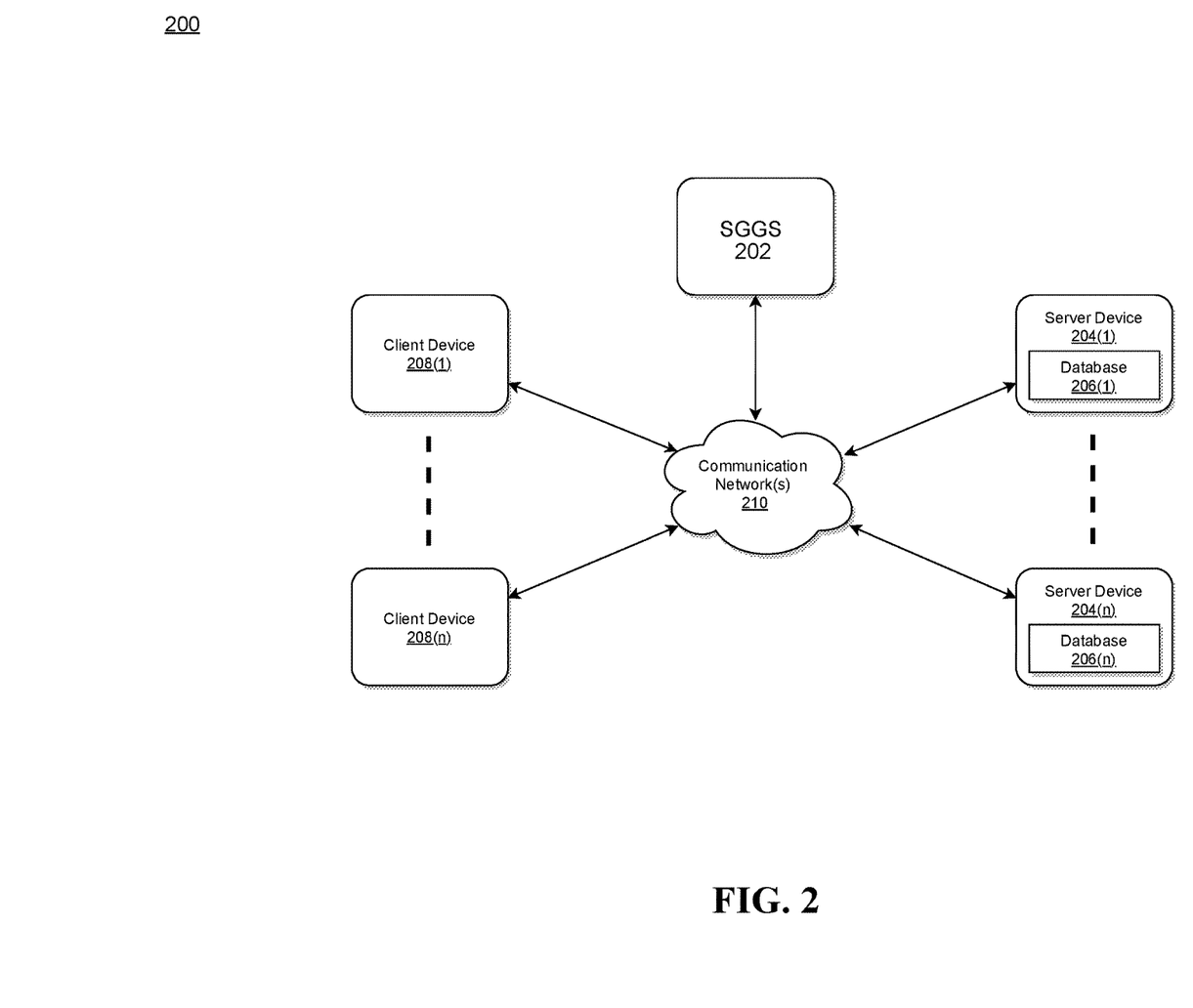
FIG. 2 illustrates an exemplary diagram of a network environment with a SGGS in accordance with an exemplary embodiment.

FIG. 2 illustrates an exemplary diagram of a network environment with a SGGS in accordance with an exemplary embodiment.

A SGGS 202 may be implemented with one or more computer systems similar to the computer system 102 as described with respect to FIG. 1.

The SGGS 202 may store one or more applications that can include executable instructions that, when executed by the SGGS 202, cause the SGGS 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the SGGS 202 itself, may be located in virtual server(s) running in a cloud-based computing environment rather than being tied to one or more specific physical network computing devices. Also, the application (s) may be running in one or more virtual machines (VMs) executing on the SGGS 202. Additionally, in one or more embodiments of this technology, virtual machine(s) running on the SGGS 202 may be managed or supervised by a hypervisor.

In the network environment 200 of FIG. 2, the SGGS 202 is coupled to a plurality of server devices 204(1)-204(n) that hosts a plurality of databases 206(1)-206(n), and also to a plurality of client devices 208(1)-208(n) via communication network(s) 210. According to exemplary aspects, databases 206(1)-206(n) may be configured to store data that relates to distributed ledgers, blockchains, user account identifiers, biller account identifiers, and payment provider identifiers. A communication interface of the SGGS 202, such as the network interface 114 of the computer system 102 of FIG. 1, operatively couples and communicates between the SGGS 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SGGS 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SGGS 202 may be a standalone device or integrated with one or more other devices or apparatuses, such as one or more of the server devices 204(1)-204(n), for example. In one particular example, the SGGS 202 may be hosted by one of the server devices 204(1)-204(n), and other arrangements are also possible. Moreover, one or more of the devices of the SGGS 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204(n) in this example may process requests received from the SGGS 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206 (n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the SGGS 202 that may efficiently provide a platform for implementing a cloud native SGGS module, but the disclosure is not limited thereto.

The client devices 208(1)-208(n) may run interface applications, such as standard web browsers or standalone client applications, which may provide an interface to communicate with the SGGS 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the SGGS 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SGGS 202, the server devices 204(1)-204(n), or the client devices 208(1)-208(n), for example, may be configured to operate as virtual instances on the same physical machine. For example, one or more of the SGGS 202, the server devices 204(1)-204(n), or the client devices 208(1)-208(n) may operate on the same physical device rather than as separate devices communicating through communication network(s) 210. Additionally, there may be more or fewer SGGS 202, server devices 204(1)-204(n), or client devices 208(1)-208(n) than illustrated in FIG. 2. According to exemplary embodiments, the SGGS 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network(s) using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
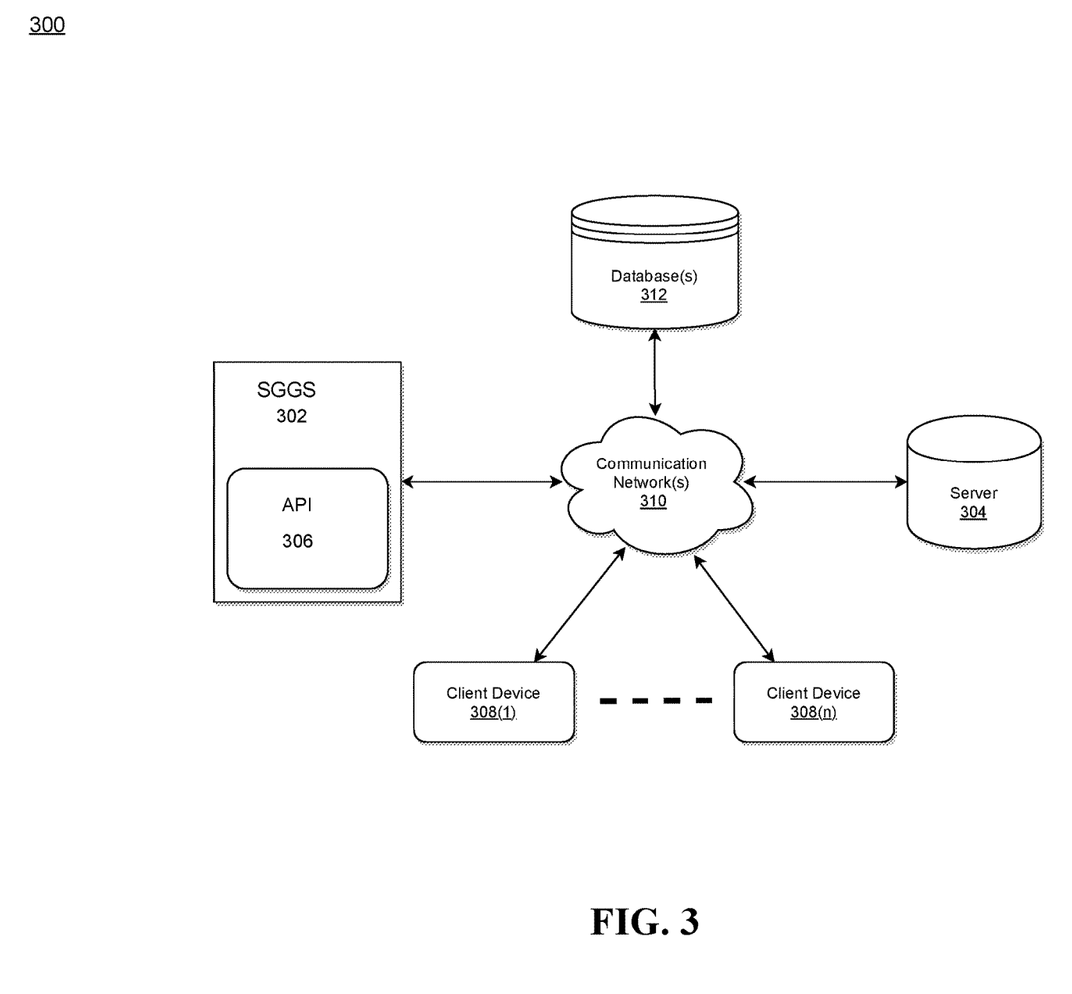
FIG. 3 illustrates a system diagram for implementing a SGGS in accordance with an exemplary embodiment.

FIG. 3 illustrates a system diagram for implementing a SGGS in accordance with an exemplary embodiment.

As illustrated in FIG. 3, the system 300 may include a SGGS 302 within which a group of API modules 306 is embedded, a server 304, a database(s) 312, a plurality of client devices 308(1) . . . 308(n), and a communication network 310.

According to exemplary embodiments, the SGGS 302 including the API modules 306 may be connected to the server 304, and the database(s) 312 via the communication network 310. Although there is only one database has been illustrated, the disclosure is not limited thereto. Any number of databases may be utilized. The SGGS 302 may also be connected to the plurality of client devices 308(1) . . . 308(n) via the communication network 310, but the disclosure is not limited thereto.

According to exemplary embodiment, the SGGS 302 is described and shown in FIG. 3 as including the API modules 306, although it may include other rules, policies, modules, databases, or applications, for example. According to exemplary embodiments, the database(s) 312 may be embedded within the SGGS 302. According to exemplary embodiments, the database(s) 312 may be configured to store configuration details data corresponding to a desired data to be fetched from one or more data sources, user information data etc., but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable SGGS as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the SGGS 302. In this regard, the plurality of client devices 308(1) . . . 308(n) may be "clients" of the SGGS 302 and are described herein as such. Nevertheless, it is to be known and understood that the plurality of client devices 308(1) . . . 308(n) need not necessarily be "clients" of the SGGS 302, or any entity described in association therewith herein. Any additional or alternative relationship may exist between either or both of the plurality of client devices 308(1) . . . 308(n) and the SGGS 302, or no relationship may exist.

The first client device 308(1) may be, for example, a smart phone. Of course, the first client device 308(1) may be any additional device described herein. The second client device 308(*n*) may be, for example, a personal computer (PC). Of course, the second client device 308(*n*) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(*n*) may communicate with the SGGS 302 via broadband or cellular communication. Of course, these embodiments are merely exemplary and are not limiting or exhaustive.

The client devices 308(1) . . . 308(*n*) may be the same or similar to any one of the client devices 208(1)-208(*n*) as described with respect to FIG. 2, including any features or combination of features described with respect thereto. The SGGS 302 may be the same or similar to the SGGS 202 as described with respect to FIG. 2, including any features or combination of features described with respect thereto.

Figure 4:
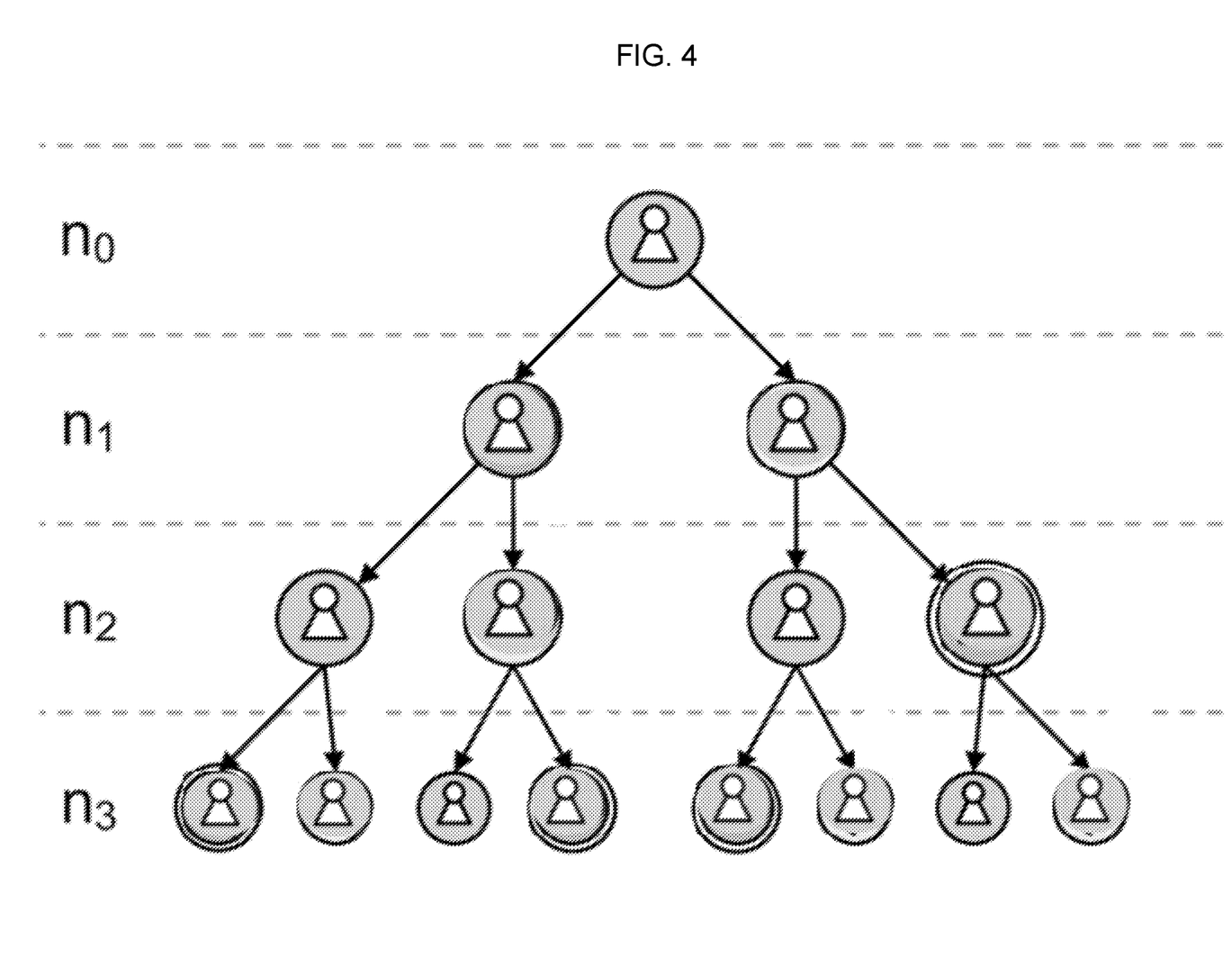
FIG. 4 illustrates a social graph in accordance with an exemplary embodiment.

FIG. 4 illustrates a social graph in accordance with an exemplary embodiment.

By building a social graph by utilizing payment data and other consumer related information, a social graph may be established to provide for a searchable directory with certain level of confidence. According to exemplary aspects, each data node may represent users who has sent or received a request or payment to or from another user. Based on such transactions, for example, a number of transactions conducted between users may be utilized to create a score or rank. Further, initial score or rank may be modified based on additional data, such as a user's zip code, street address, company, a number of mutual transacting users, current location and the like.

Based on such data, a social graph may be generated. In an example, the social graph may indicate different tiers or levels of relationships, which may indicate a confidence level that a person in the social graph corresponding to a search query is the correct target user. According to exemplary aspects, the social graph may be a displayable graph or simply a data mapping indicating hierarchal relationships among various users.

As illustrated in FIG. 4, different levels of connections may be established based on prior transactions, personal data, and/or social data. According to exemplary aspects, tier $n_o$ may indicate a user. Tier n1 may indicate a first level connection, which may indicate a direct relationship with the user. For example, if the user has directly transacted with another user (e.g., person A), then the person A would be a first level connection. If the user's contact (e.g., person A) had directly transacted with another person (e.g., person B), then the person B would be a second level connection. If the user's direct contact, person A, had directly transacted with a second level connection contact, such as person B, who transacted with another person (e.g., person C), then the person C would be a third level connection. Based on such designations of levels, a search result of potential candidates corresponding to a higher relationship level with the user may show up first or higher on a search list in response to a search query. For example, if a search is conducted for John Smith, a potential candidate named John Smith designated at the first level connection would appear above another John Smith designated at the second level connection. Similarly, John Smith designated at the second level connection may appear above another John Smith designated at the third level connection.

Although only three connection levels are illustrated, aspects of the present disclosure are not limited thereto, such that more or less levels may be utilized. Further, even within a same level, certain users may have a higher rank or confidence level based on personal information. For example, if there are multiple John Smiths in the first level connections, a John Smith that is closest in location to the user's residence or current location may have a higher score or rank than other John Smiths. Further, a John Smith having a more recent or a higher number of transactions with the user may have a higher score or rank over other John Smiths in the first level connection.

Once such a social graph or connection scores/ranks are established, a search for such a contact may be performed for identifying a target contact for performing a transaction.

Although a social graph is illustrated in FIG. 4, actual graph may or may not be generated or established. Underlying data may be utilized with or without the graph to identify the target contact.

Moreover, the social graph or connections may be updated based on transactions according to one or more artificial intelligence (AI) or machine learning (ML) models.

Generally, AI or ML algorithms may be executed to perform data pattern detection, and to provide an output or render a decision based on the data pattern detection. More specifically, an output may be provided based on a historical pattern of data, such that with more data or more recent data, more accurate outputs and/or decisions may be provided or rendered. Accordingly, the ML or AI models may be constantly updated after a predetermined number of runs or iterations. According to exemplary aspects, machine learning may refer to computer algorithms that may improve automatically through use of data. Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, k-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the ML or AI models may be generated using at least one from among an artificial neural network technique, a decision tree technique, a support vector machines technique, a Bayesian network technique, and a genetic algorithms technique.

Figure 5:
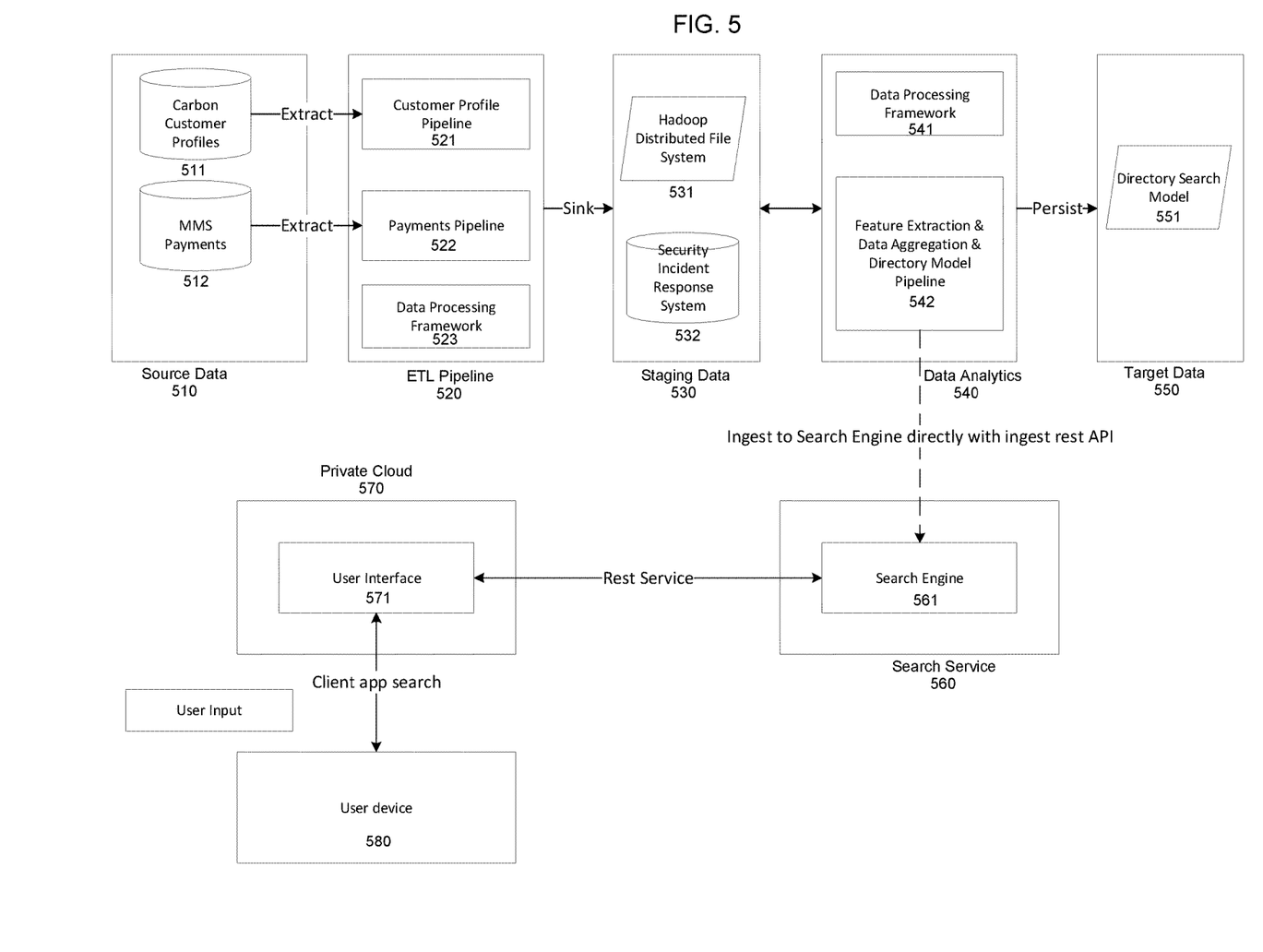
FIG. 5 illustrates a flow diagram for generating a social graph based on payment data in accordance with an exemplary embodiment.

FIG. 5 illustrates a flow diagram for generating a social graph based on payment data in accordance with an exemplary embodiment.

As illustrated in FIG. 5, a system for generating a social graph may include a source data 510, an ETL (extract, transform, load) pipeline 520, staging data 530, data analytics 540, target data 550, search service 560, private cloud 570 and a user device 580.

The source data 510 includes a carbon customer profiles database 511 and a multimedia messaging service (MMS) payments database 512. According to exemplary aspects, the carbon customer profiles database 511 may include user or customer-based information of a customer, such as, address (es) including city and zip codes, employment information, contact information (e.g., phone number, email address or etc.), profile image or logo, alternative identification (e.g., Zelle tag) and the like. Further, customer-based information is not limited to an individual person, and may include a business, organization, or the like.

The MMS payments database 512 may store previous payment transactions made by the respective customer. Previous payment transactions may indicate date of transaction, recipient information, sender information, amount sent or received, location of transaction, frequency of transaction with certain senders or recipients, and the like. Although present application is directed to mobile, peer-to-peer (P2P) or MMS payment service, aspects of the present disclosure are not limited thereto, such that previous automated clearing house (ACH) or the clearing house (TCH) transactions or the like may also be included.

The ETL pipeline 520 includes a customer profile pipeline 521, a payments pipeline 522, and a data processing framework 523. According to exemplary aspects, the ETL pipeline 520 may refer to a set of processes used to move data from a source data into a data warehouse. More specifically, the customer profile pipeline 521 may perform one or more operations to extract data from the carbon customer profiles database 511, transform the extracted data, and load or sink the data to the staging data 530. The payments pipeline 522 may perform one or more operations to extract data from the MMS payments database 512, transform the extracted data, and load or sink the data to the staging data 530. The data processing framework 523 may facilitate the set of operations performed by the ETL pipeline 520.

The staging data 530 includes a Hadoop distributed file system 531 and security incident response system 532. The Hadoop distributed file system 531 may be used to scale a single cluster of data to hundreds or thousands of data nodes, and allow rapid transfers between nodes. The security incident response system 532 may analyze observable information, such as IP addresses, email addresses, URLs, domain names, files or hashes via a web interface. Such operations may be automated to provide more efficient operations.

The data analytics 540 includes a data processing framework 541 and a feature extraction and data aggregation, and directory model pipeline 542. In an example, the feature extraction and data aggregation, and directory model pipeline 542 may utilize one or more AI or ML algorithms for performing data feature extraction and data aggregation, and delivery of directory model to the target data 550. Further, the feature extraction and data aggregation, and directory model pipeline 542 may render its information searchable by a search engine 561 included in the search service 560, by ingesting to the search engine 561 directly with ingest representational state transfer (REST) API. According to exemplary aspects, the data processing framework 541 may facilitate the set of operations performed by the data analytics 540.

The data analytics system 540 may analyze the acquired data and generate various data nodes for each customer or user entity. For example, each data node may be associated with a name, address (including city, county, and/or zip code), employer information, associated organizations, parties/entities that transacted with the respective customer previously, profile image/picture, alternate identification (e.g., Zelle tag) and the like.

Further, based on the acquired data and analysis, corresponding score or rank may be generated for each of the data nodes with respect to the respective user or customer. For example, a score or rank may be generated based on one or more of the following attributes: a number of transactions between the customer and other nodes, zip codes of the nodes, street addresses of the nodes, relative location (current location or home location) proximity of the nodes, commonality of organization between the nodes (e.g., parties belonging to a same organization), a number of mutual parties that have conducted transactions with the nodes, and the like. In an example, such score or rank may be updated periodically, in response to a data update, or dynamically in real-time.

Based on the generated scores and the inputted search, relationships between the user/customer and the other nodes may be determined. Based on the scores or rank, each of the analyzed data nodes may be identified according to its respective level indicating relationship proximity to the customer node. For example, some data nodes may be indicated as being a first level connection, whereas other data nodes may be indicated as a second or third level connections.

According to exemplary aspects, a first level connection may indicate a direct relationship with the user. For example, if the user has directly transacted with another user (e.g., person A), then the person A would be a first level connection. If the user's contact had directly transacted with another person (e.g., person B), then the person B may be a second level connection. If the user's direct contact, person A, had directly transacted with a second level connection contact, such as person B, who transacted with another person (e.g., person C), then the person C may be a third level connection. Based on such designations of proximity levels with respect to the user/customer, a search result corresponding to higher levels may show up higher on a list of results in response to a search query. For example, if a search is conducted for John Smith, a person named John Smith designated at the first level connection would appear above another John Smith designated at the second level connection. Similarly, John Smith designated at the second level connection may appear above another John Smith designated at the third level connection.

The generated scores/rank and relationships for the analyzed nodes may be provided to the target data 550 for storage in its directory search model 551, which may be retrieved or accessed at a later time. The search directory model may provide a categorized index of nodes with corresponding relationships, which may be searchable. In an example, the generated relationship information may be stored at a data level, but may be graphically displayed in response to a request.

Further, the generated scores/rank and relationships for the analyzed nodes may be ingested by a search engine 561 directly with ingest REST API provided by the search service 560. The search engine 561 may be operated in response to a user inputted search provided to a user interface 571 provided on the private cloud 570 for identifying a target recipient for conducting a mobile, P2P or MMS payment transaction. The search engine 561 and the user interface 571 may interact with one another via a REST service. Although a private cloud network is illustrated as providing the user interface 571, aspects of the present disclosure are not limited thereto, such that the user interface 571 may reside over a public cloud network or a non-cloud network.

Further, when user provides a user provided input for a target recipient via the user interface 571, the search engine 561 may generate a list of candidates in a sequential order based on the scoring/rank or relationship with respect to the user or customer submitting the search. In an example, the scores/rank/relationship may be pulled directly from the directory search model 551, or a new scoring/rank/relationship may be generated based on current information of the user or customer. For example, if the user or customer normally resides in Washington D.C., but is currently located in San Jose, California when a search request is inputted, new potential candidates may be generated or based on the new location information.

When providing results of the user inputted search, results may be sequentially ordered according to score, rank or relationship level, Further, the results may be color coded or displayed different according to score, rank or relationship level. For each of the results, corresponding information may also be displayed, such as application specific identifier or tag information, profile image or business logo, and/or other publicly identifiable information. Additionally, previous payment transaction information may also be displayed. Such information may be provided on the list or in response to a user selection of the resulting entity or node. Moreover, one or more information may be hidden from view based on an entity type (e.g., individual vs. business) or by a request of a corresponding user. According to exemplary aspects, different information may be provided based on whether a potential candidate is an individual candidate or an organizational candidate, such as a business. For example, for an organizational candidate, a name, an application specific identifier, contact information (e.g., a phone number, mailing/physical address, email address and etc.) and a profile image or business logo or the like may be provided. Alternatively, for an individual candidate, only a name, an application specific identifier, and a profile image may be provided. Although present application is directed to mobile, P2P or MMS payment service, aspects of the present disclosure are not limited thereto, such that ACH or TCH transactions or the like may be conducted in a similar manner.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects.

Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for generating a searchable social graph based on payment data, the method comprising:
    extracting, from a carbon customer profile database, customer-based information for a plurality of entities;
    extracting, from a payment database, previous transaction information conducted by the plurality of entities;
    generating a plurality of data nodes for the plurality of entities with respect to a target user;
    determining a score for each of the plurality of data nodes with respect to the target user based on the extracted customer-based information and the previous transaction information, wherein the score indicating a proximity level with the target user, and wherein the score is based on a number of intervening data nodes between a respective node and a data node corresponding to the target user;
    generating a searchable relationship model for the plurality of data nodes with respect to the target user based on the determined score, wherein the searchable relationship model arranges the plurality of data nodes in a descending order in accordance with degrees of connection with the target user that correspond to the proximity level, the degrees of connection includes a first degree connection that is a direct connection with the data node corresponding to the target user, a second degree connection that is an indirect connection with the data node corresponding to the target user via one intervening data node, and a third degree connection that is an indirect connection with the data node corresponding to the target user via two intervening data nodes;
    receiving, on a user interface, an input provided by the target user;
    performing a search, using the searchable relationship model based on the input provided by the target user;
    identifying, based on the search performed via the searchable relationship model, one or more data nodes among the plurality of data nodes as potential recipient candidates for conducting a transaction;
    displaying, on the user interface, the potential recipient candidates for the provided input based on the proximity level with respect to the target user, wherein the potential recipient candidates are displayed in a descending order in accordance with the proximity level with respect to the target user; and
    receiving, via the user interface, a selection among the potential recipient candidates as a target recipient.

2. The method according to claim 1, further comprising displaying the searchable social graph based on the searchable relationship model and in accordance with the degrees of connection with the target user corresponding to the proximity level.

3. The method according to claim 1, wherein the proximity level includes a first level, a second level, and a third level.

4. The method according to claim 3, wherein the first level includes a data node having a direct relationship with the target user.

5. The method according to claim 4, wherein the second level includes a data node having a direct relationship with the data node of the first level.

6. The method according to claim 5, wherein the third level includes a data node having a direct relationship with the data node of the second level.

7. The method according to claim 1, wherein the customer-based information includes at least one of a mailing address, employment information, contact information, and a profile image.

8. The method according to claim 1, wherein the previous transaction information includes a date of transaction, recipient information, sender information, an amount sent or received, and a location of transaction.

9. The method according to claim 1, wherein the plurality of entities includes at least an individual person and an organization.

10. The method according to claim 1, wherein the providing of the potential recipient candidates includes providing of a corresponding address, contact information and a profile image.

11. The method according to claim 1, wherein the providing of the potential recipient candidates includes providing of application specific identifiers of potential recipient candidates.

12. The method according to claim 11, wherein the providing of the potential recipient candidates hides private information of at least one of the potential recipient candidates.

13. The method according to claim 1, wherein the providing of the potential recipient candidates excludes providing of private information of at least one of the potential recipient candidates.

14. The method according to claim 1, wherein the providing of the potential recipient candidates includes providing different sets of information for individual candidates and organizational candidates.

15. The method according to claim 10, wherein the corresponding address and the contact information are only provided for organizational candidates.

16. The method according to claim 10, wherein the providing of the potential recipient candidates further includes at least one corresponding historical transaction.

17. The method according to claim 1, wherein the determining the score for each of the plurality of entities includes accessing a database to retrieve a corresponding score stored in a database.

18. The method according to claim 1, wherein the determining the score for each of the plurality of entities includes dynamically generating a corresponding score based on a current location information of the target user.

19. A system to generate a searchable social graph based on payment data, the system comprising:
  a memory; and
  a processor, wherein the processor is configured to:
    extract, from a carbon customer profile database, customer-based information for a plurality of entities;
    extract, from a payment database, previous transaction information conducted by the plurality of entities;
    generate a plurality of data nodes for the plurality of entities with respect to a target user;
    determine a score for each of the plurality of data nodes with respect to the target user based on the extracted customer-based information and the previous transaction information, wherein the score indicating a proximity level with the target user, and wherein the score is based on a number of intervening data nodes between a respective node and a data node corresponding to the target user;
    generate a searchable relationship model for the plurality of data nodes with respect to the target user based on the determined score, wherein the searchable relationship model arranges the plurality of data nodes in a descending order in accordance with degrees of connection with the target user that correspond to the proximity level, the degrees of connection includes a first degree connection that is a direct connection with the data node corresponding to the target user, a second degree connection that is an indirect connection with the data node corresponding to the target user via one intervening data node, and a third degree connection that is an indirect connection with the data node corresponding to the target user via two intervening data nodes;
    receive, on a user interface, an input provided by the target user;
    perform a search, using the searchable relationship model based on the input provided by the target user;
    identify, based on the search performed via the searchable relationship model, one or more data nodes among the plurality of data nodes as potential recipient candidates for conducting a transaction;
    display, on the user interface, the potential recipient candidates for the provided input based on the proximity level with respect to the target user, wherein the potential recipient candidates are displayed in a descending order in accordance with the proximity level with respect to the target user; and
    receive, via the user interface, a selection among the potential recipient candidates as a target recipient.

20. A non-transitory computer readable storage medium that stores a computer program for generating a searchable social graph based on payment data, the computer program, when executed by a processor, perform a process comprising:
  extracting, from a carbon customer profile database, customer-based information for a plurality of entities;
  extracting, from a payment database, previous transaction information conducted by the plurality of entities;
  generating a plurality of data nodes for the plurality of entities with respect to a target user;
  determining a score for each of the plurality of data nodes with respect to target user based on the extracted customer-based information and the previous transaction information, wherein the score indicating a proximity level with the target user, and wherein the score is based on a number of intervening data nodes between a respective node and a data node corresponding to the target user;
  generating a searchable relationship model for the plurality of data nodes with respect to the target user based on the determined score, wherein the searchable relationship model arranges the plurality of data nodes in a descending order in accordance with degrees of connection with the target user that correspond to the proximity level, the degrees of connection includes a first degree connection that is a direct connection with the data node corresponding to the target user, a second degree connection that is an indirect connection with the data node corresponding to the target user via one intervening data node, and a third degree connection that is an indirect connection with the data node corresponding to the target user via two intervening data nodes;
  receiving, on a user interface, an input provided by the target user;
  performing a search, using the searchable relationship model based on the input provided by the target user;
  identifying, based on the search performed via the searchable relationship model, one or more data nodes among the plurality of data nodes as potential recipient candidates for conducting a transaction;
  displaying, on the user interface, the potential recipient candidates for the provided input based on the proximity level with respect to the target user, wherein the potential recipient candidates are displayed in a descending order in accordance with the proximity level with respect to the target user; and
  receiving, via the user interface, a selection among the potential recipient candidates as a target recipient.

* * * * *